United States Patent
Chung

(10) Patent No.: US 10,564,773 B2
(45) Date of Patent: Feb. 18, 2020

(54) TOUCH DISPLAY DEVICE, TOUCH SYSTEM, TOUCH MASTER, AND COMMUNICATION METHOD

(71) Applicant: LG Display Co., Ltd., Seoul (KR)

(72) Inventor: JuneGun Chung, Yongin-si (KR)

(73) Assignee: LG Display Co., Ltd., Seoul (KR)

( * ) Notice: Subject to any disclaimer, the term of this patent is extended or adjusted under 35 U.S.C. 154(b) by 197 days.

(21) Appl. No.: 15/785,115

(22) Filed: Oct. 16, 2017

(65) Prior Publication Data

US 2018/0107338 A1    Apr. 19, 2018

(30) Foreign Application Priority Data

Oct. 17, 2016 (KR) .................. 10-2016-0134516

(51) Int. Cl.
*G06F 3/044*    (2006.01)
*G06F 3/041*    (2006.01)

(52) U.S. Cl.
CPC .......... *G06F 3/0418* (2013.01); *G06F 3/044* (2013.01)

(58) Field of Classification Search
CPC ......... G06F 11/07; G06F 3/0418; G06F 3/044
USPC .................................................. 345/170–178
See application file for complete search history.

(56) References Cited

U.S. PATENT DOCUMENTS

| | | | | |
|---|---|---|---|---|
| 5,926,121 A | * | 7/1999 | Kuwaoka | H03M 7/3002 341/100 |
| 6,049,535 A | * | 4/2000 | Ozukturk | H04B 1/707 370/335 |
| 2005/0122767 A1 | * | 6/2005 | Perner | G11C 11/16 365/158 |
| 2011/0158202 A1 | * | 6/2011 | Ozukturk | H04B 1/707 370/335 |
| 2012/0056662 A1 | * | 3/2012 | Wilson | G06F 3/0416 327/517 |
| 2012/0146941 A1 | * | 6/2012 | Shin | G06F 3/045 345/174 |
| 2013/0335376 A1 | * | 12/2013 | Lee | G06F 3/0416 345/174 |
| 2016/0065192 A1 | * | 3/2016 | Lee | H03K 5/05 327/163 |
| 2016/0266704 A1 | * | 9/2016 | Park | G06F 3/0416 |
| 2017/0212617 A1 | * | 7/2017 | Yuan | G06F 3/044 |
| 2018/0150168 A1 | * | 5/2018 | Jung | G06F 3/044 |
| 2018/0181226 A1 | * | 6/2018 | Zheng | G06F 3/044 |
| 2019/0042049 A1 | * | 2/2019 | Kumar | G06F 3/0416 |
| 2019/0155448 A1 | * | 5/2019 | Chia | G06F 3/0416 |

\* cited by examiner

*Primary Examiner* — Tony O Davis
(74) *Attorney, Agent, or Firm* — Polsinelli PC

(57) ABSTRACT

Disclosed are a touch display device, a touch system, a touch master, and a communication method and, more particularly, are a touch display device, a touch system, a touch master, and a communication method which can provide a communication protocol and a communication interface based on a master-slave system in which a touch driving device operates as a touch slave and a touch controller operates as a touch master. Communication between the touch driving device and the touch controller can be accurately and rapidly performed and data transmission efficiency can increase.

20 Claims, 18 Drawing Sheets

Read Process

Read Process

TOUCH DISPLAY DEVICE, TOUCH SYSTEM, TOUCH MASTER, AND COMMUNICATION METHOD

CROSS REFERENCE TO RELATED APPLICATION

This application claims priority from Korean Patent Application No. 10-2016-0134516, filed Oct. 17, 2016, which is hereby incorporated by reference in its entirety for all purposes as if fully set forth herein.

BACKGROUND

Field of the Disclosure

The present disclosure relates to a display device, and more particularly, to a touch display device, touch system, touch master, and communication method.

Description of the Background

As the information society develops, demands for display devices for displaying an image are increasing in various forms, and in recent years, various display devices such as Liquid Crystal Displays (LCDs), Plasma Display Panels (PDPs), and Organic Light Emitting Display Devices (OLEDs) have been utilized.

Among the display device, a touch display device that provides a touch-based input scheme to allow a user to easily, intuitively and, conveniently input information or instructions, breaking away from the traditional input scheme such as a button, a keyboard, or a mouse.

In order to provide the touch-based input scheme of the touch display device, it should be detected whether there is a touch by a user and an accurate touch coordinate (i.e., touch location) should be detected.

In order to correctly recognize the existence or non-existence of the touch or the touch location, the touch display device should accurately control the operation of the touch driving device, accurately transmit sensing data acquired through touch driving of the touch driving device to the touch controller, and accurately control the touch driving of the touch driving device.

However, since the conventional touch display device does not have an accurate protocol designated for communication between the touch driving device for performing touch driving and the touch controller for detecting the existence or non-existence of the touch and the touch location, data transmission between the touch driving device and the touch controller may not be properly performed.

Further, since the conventional touch display device does not have a method by which the touch controller controls the touch driving device while a process related to the touch operation is performed between the touch driving device and the touch controller, it is required to stop the process being performed, control the touch driving device, and then reinitiate the stopped process.

Accordingly, a touch-related processing time of the touch controller may become longer or data transmission efficiency can be deteriorated.

SUMMARY

Accordingly, the present disclosure is directed to a touch display device, a touch system, a touch master, and a communication method that substantially obviate one or more of problems due to limitations and disadvantages of the prior art.

Additional features and advantages of the disclosure will be set forth in the description which follows and in part will be apparent from the description, or may be learned by practice of the invention. Other advantages of the present disclosure will be realized and attained by the structure particularly pointed out in the written description and claims hereof as well as the appended drawings.

An aspect of the present disclosure is to provide a touch display device, a touch system, a touch master, and a communication method which can provide a communication protocol and a communication interface based on a master-slave system in which a touch driving device operates as a touch slave and a touch controller operates as a touch master so as to accurately and rapidly perform communication between the touch driving device and the touch controller.

Another aspect of the present disclosure is to provide a touch display device, a touch system, a touch master, and a communication method which can reduce a touch-related processing time and increase data transmission efficiency.

Yet another aspect of the present disclosure is to provide a touch display device, a touch system, a touch master, and a communication method which can remove noise generated in data transmission between the touch master and the touch slave so as to enable reliable data transmission.

In accordance with an aspect of the present disclosure, a touch system is provided. The touch system includes: a touch slave configured to receive sensing signals by supplying touch driving signals to a plurality of touch electrodes arranged on a touch screen panel, generate sensing data based on the sensing signals, and output the generated sensing data as slave data during a touch sensing interval; a touch master configured to control the touch slave and detect the existence or non-existence of a touch or a touch coordinate based on the sensing data; a communication interface for communication between the touch master and the touch slave; and a filter unit configured to filter a noise component in the slave data output from the touch slave, wherein the filter unit includes: a sampler configured to sample bits in the slave data according to predefined filter window information; and a count comparator configured to count and compare the number of first bit values (0) and the number of second bit values (1) in the sampled bits and determine one of the first bit value and the second bit value as a final value based on a result of the comparison.

The predefined filter window information may include a number of bits (sampling range or window size) to be sampled in the slave data and locations (sampling locations) at which the bits are sampled in the slave data.

The sampled bits in the slave data may be odd-numbered.

With respect to locations (a, b, c, d, e) at which bits are sampled in the slave data, only one location (c) at which a bit value is changed based on clock information may be included.

In locations (a, b, c, d, e) at which bits are sampled in the slave data, the number of locations before the location (c) at which the bit value is changed may be larger than the number of locations after the location (c) at which the bit value is changed.

The count comparator may determine the larger number of bit values between the first bit value (0) and the second bit value (1) as a final value.

The filter unit may be included within the touch master.

The filter unit may be located between the touch slave and the touch master.

In accordance with another aspect of the present disclosure, a communication method of a touch system is provided. The communication method of a touch system includes: starting communication between a touch master and a touch slave; outputting slave data to be transmitted to the touch master from the touch slave; and filtering noise in the salve data output from the touch slave, wherein the filtering of the noise includes: sampling bits in the slave data according to predefined filter window information; and counting and comparing the number of first bit values (0) and the number of second bit values (1) in the sampled bits, and determining one of the first bit value and the second bit value as a final value based on a result of the comparison.

In accordance with another aspect of the present disclosure, a touch display device is provided. The touch display device includes: a touch screen panel on which a plurality of touch electrodes are arranged; a touch slave configured to receive sensing signals by supplying touch driving signals to a plurality of touch electrodes arranged on the touch screen panel, generate sensing data based on the sensing signals, and output the generated sensing data as slave data during a touch sensing interval; a touch master configured to control the touch slave and detect the existence or non-existence of a touch or a touch coordinate based on the sensing data; a communication interface for communication between the touch master and the touch slave; and a filter unit configured to filter a noise component in the slave data output from the touch slave, wherein the filter unit includes: a sampler configured to sample bits in the slave data according to predefined filter window information; and a count comparator configured to count and compare the number of first bit values (0) and the number of second bit values (1) in the sampled bits and determine the first bit value or the second bit value as a final value according to a result of the comparison.

The present disclosure described above may provide a touch display device, a touch system, a touch master, a touch slave, and a communication method which can provide a communication protocol and a communication interface based on a master-slave system in which a touch driving device operates as a touch slave and a touch controller operates as a touch master so as to accurately and rapidly perform communication between the touch driving device and the touch controller.

Further, the present disclosure described above may provide a touch display device, a touch system, a touch master, a touch slave, and a communication method which can reduce a touch-related processing time and increase data transmission efficiency.

In addition, the present disclosure described above may provide a touch display device, a touch system, a touch master, a touch slave, and a communication method which can check errors generated in data transmission between the touch master and the touch slave and enable reliable data transmission through the checked errors.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
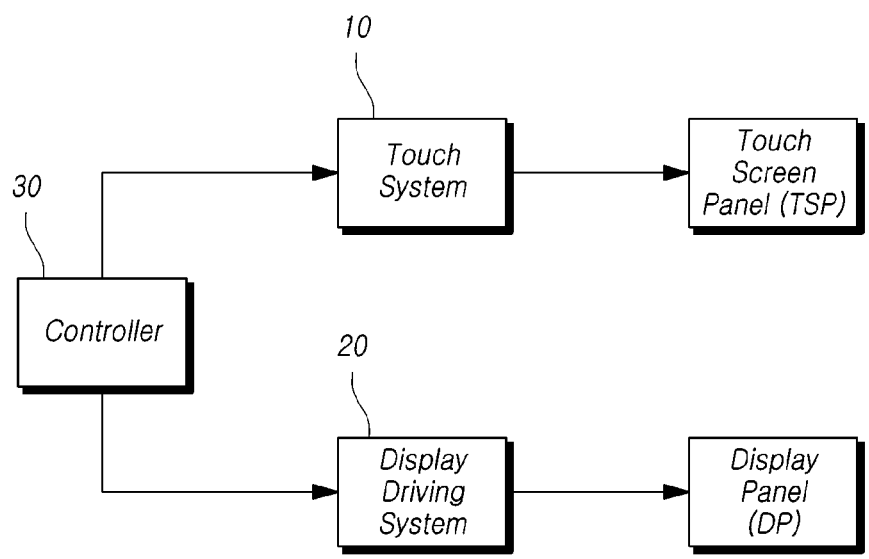
FIG. 1 is a block diagram illustrating a touch display device according to the present disclosure.

Hereinafter, some aspects of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

The present disclosure may provide a communication protocol and a communication interface based on a master-slave system in which a touch driving device operates as a touch slave and a touch controller operates as a touch master.

The touch driving device and the touch controller can accurately and smoothly communicate with each other therethrough.

The present disclosure may provide a touch display device, a touch system, a touch master, and a communication method which can reduce a touch-related processing time and increase data transmission efficiency.

The present disclosure may provide a communication protocol and a communication interface which enable reliable data transmission by removing noise generated in data transmission between the touch master and the touch slave.

Hereinafter, the above-described present disclosure will be described through examples with reference to the accompanying drawings.

Figure 2:
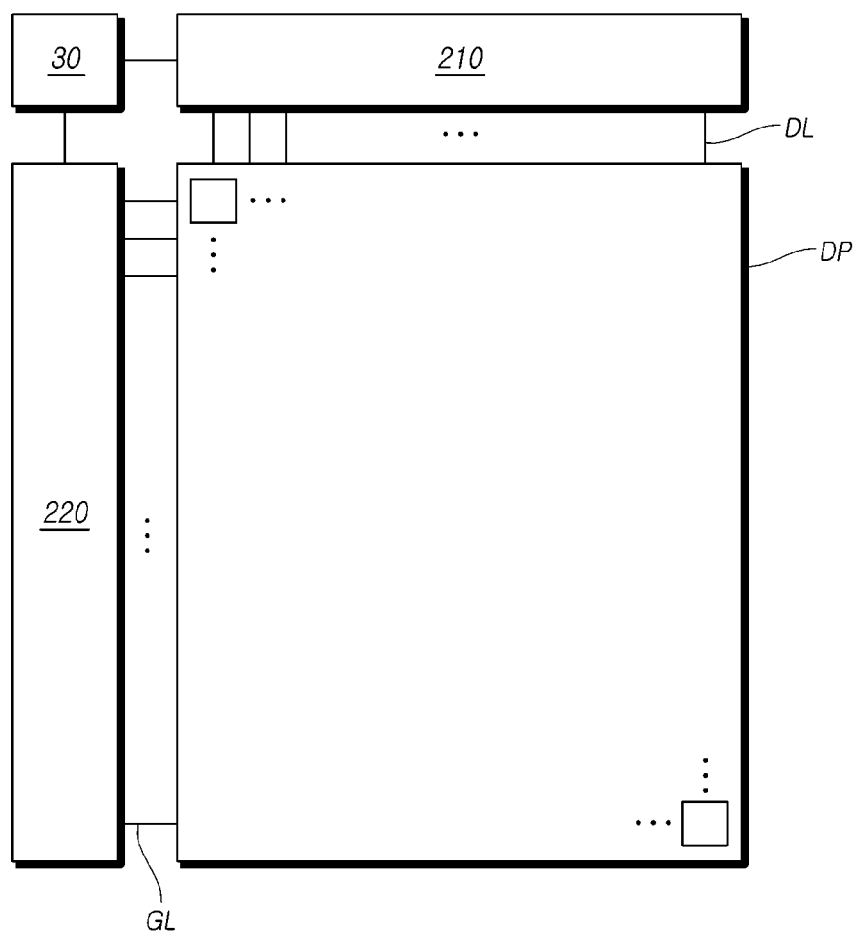
FIG. 2 illustrates a display driving system of the touch display device according to the present disclosure.
Figure 3:
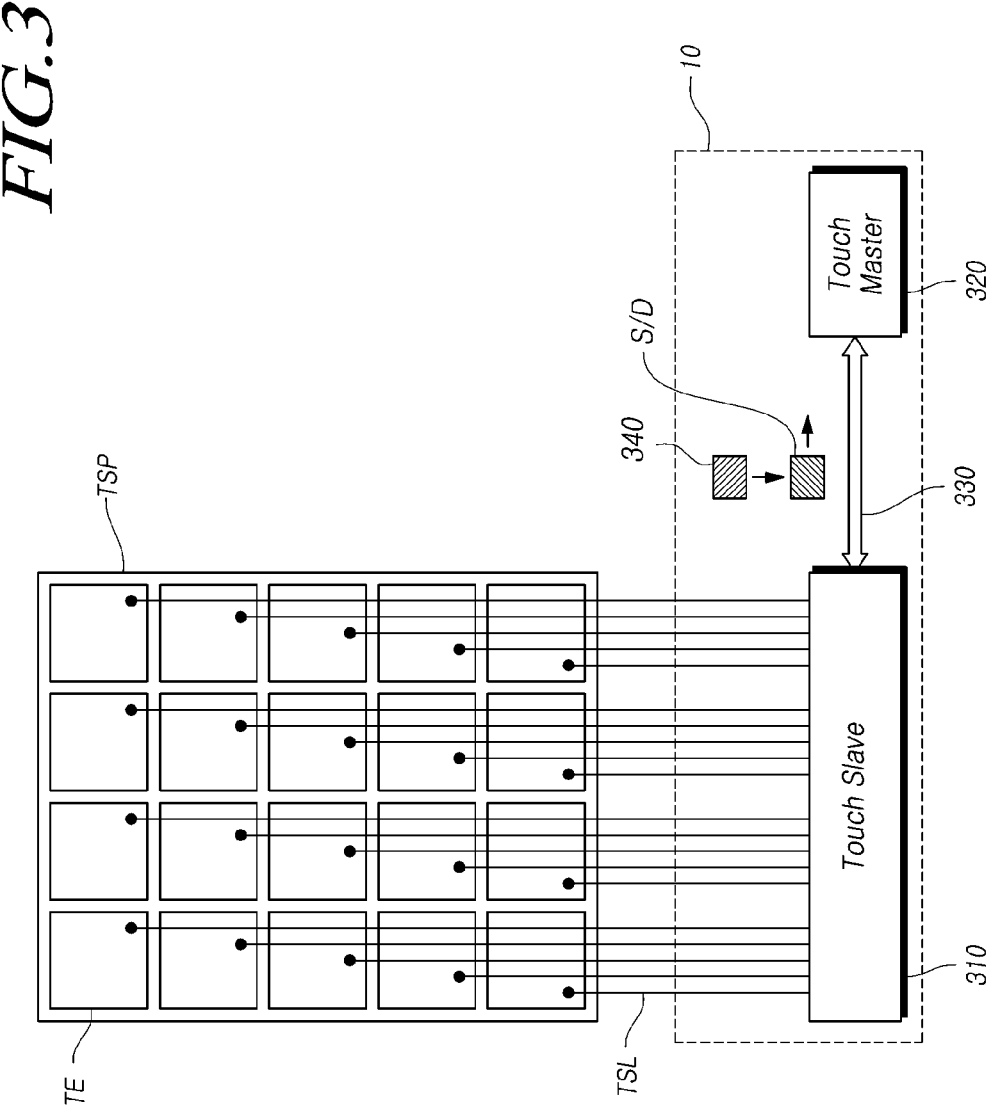
FIG. 3 illustrates a touch system of the touch display device according to the present disclosure.
Figure 4:
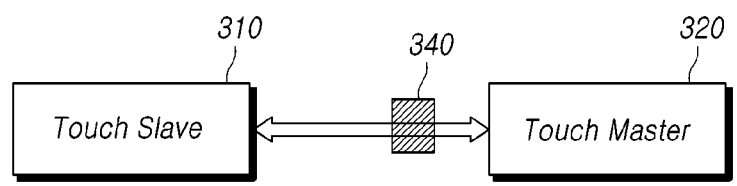
FIGS. 4 and 5 illustrate examples of a filter unit of the touch system according to the present disclosure.
Figure 5:
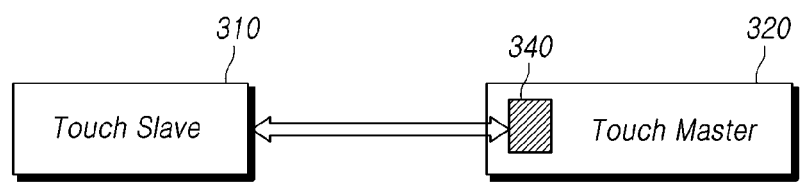

FIG. 1 illustrates a block diagram of a touch display device according to the present disclosure, FIG. 2 illustrates a display driving system of the touch display device according to the present disclosure, FIG. 3 illustrates a touch system of the touch display device according to the present disclosure, and FIGS. 4 and 5 illustrate examples of a filter unit of the touch system according to the present disclosure.

Referring to FIGS. 1 and 2, the touch display device according to the present disclosure includes a Display Panel (DP) on which a plurality of Data Lines (DLs) and a plurality of Gate Lines (GLs) are arranged and a plurality of subpixels defined by the plurality of data lines (DLs) and the plurality of gate lines (GLs) are arranged, and a display driving system 20 for driving the display panel (DP) to display an image thereon.

The display driving system 20 may include a data driver 210 for driving the plurality of data lines (DLs) by outputting an image data voltage to the plurality of data lines (DLs) and a gate driver 220 for sequentially driving the plurality of gate lines (GLs) by sequentially outputting scan signals to the plurality of gate lines (GLs).

The data driver 210 may include one or more source driver Integrated Circuits (ICs).

The gate driver 220 may include one or more gate driver ICs.

Operation timings of the data driver 210 and the gate driver 220 may be controlled by a controller 30.

Referring to FIGS. 1 and 3, the touch display device according to the present disclosure may include a Touch Screen Panel (TSP) on which a plurality of Touch Electrodes (TEs) is arranged and a plurality of signal lines (TSLs) connected to the plurality of touch electrodes (TEs) is arranged, and a touch system 10 for detecting the existence or non-existence of a touch or a touch coordinate by driving the touch screen panel (TSP).

A touch sensing operation timing of the touch system 10 may be controlled by the controller 30.

Although FIG. 3 illustrates that the plurality of touch electrodes (TEs) arranged on the touch screen panel (TSP) has a quadrangular block shape, this is only for convenience of description and the touch electrodes (TEs) may be arranged at various locations or in various patterns.

The plurality of touch electrodes (TEs) may be touch electrodes in a self-capacitance sensing type, or may be touch electrodes in a mutual-capacitance sensing type under the circumstances.

Referring to FIG. 3, the touch system 10 may include a touch slave 310 for receiving signals by sequentially supplying touch driving signals to the plurality of touch electrodes (TEs) for a touch sensing interval and generating sensing data based on the sensing signals, and a touch master 320 for controlling the operation of the touch slave 310 and detecting the existence or non-existence of a touch or a touch coordinate based on sensing data generated by the touch slave 310.

The touch slave 310 may be a touch driving device that supplies touch driving signals to the touch electrodes (TEs) and receives sensing signals from the touch electrodes (TEs) to which touch electrode signals are applied.

The touch master 320 may control the touch slave 310 and may detect, as a touch controller, the existence or non-existence of the touch or a touch location (i.e., touch coordinate) based on touch sensing data generated through touch driving of the touch slave 310.

To this end, the touch master 320 may control one or more touch slaves 310.

Referring to FIG. 3, the touch system 10 may further include a communication interface 330 for communication between the touch master 320 and the touch slave 310 in order to transfer information for controlling the operation of the touch slave 310 from the touch master 320 to the touch slave 310 and transfer sensing data generated by the touch slave 310 from the touch slave 310 to the touch master 320.

The touch system 10 may include a filter unit 340 for filtering a noise component in slave data output from the touch slave 310.

The filter unit 340 may include a sampler 343 (shown in FIG. 7) for sampling bits in the slave data transmitted from the touch slave 310 and a count comparator 346 (shown in FIG. 7) for counting and comparing the number of first bit values (0) and the number of second bit values (1) in the sampled bits and determining the first bit value or the second bit value as a final value based on a result of the comparison.

The sampler 343 may sample sensing data into a plurality of pieces of data in the touch sensing interval in which the touch screen panel (TSP) is touched and applied pressure is provided. Accordingly, the sampler 343 may input the sampled data into the count comparator 346. Here, a plurality of pieces of sampled data may be extracted. The sampled data may be extracted according to predefined filter window information.

The predefined filter window information may include information on the number of sampled bits in the slave data and the locations of the sampled bits in the slave data.

The number of sampled bits may be determined according to a sampling range or a window size.

As described above, the sampling data is input into the count comparator 346 in the predefined filter window interval. The count comparator 346 may compare a plurality of pieces of sampled data input into the count comparator 346 in the filter window interval and generate determination data.

More specifically, the count comparator 346 may count and compare the number of first bit values (0) and the number of second bit values (1) in the sampled bits and determine the first bit value or the second bit value as a final value according to a result of the comparison.

In connection with the determination data, the larger number of bit values between the first bit value (0) or the second bit value (1) may be determined as the final value.

When sampling locations (a, b, c, d, e) are defined and a variable region of the slave data is assumed as c, the locations (a, b, c, d, e) at which the bits are sampled in the slave data may include only one location (c) at which the bit value is changed based on clock information.

Further, the number of locations before the location (c) at which the bit value is changed among the locations (a, b, c, d, e) at which bits are sampled in the slave data may be larger than the number of locations after the location (c) at which the bit value is changed.

The determination data determined by the count comparator 346 is provided to the touch master 320 through the filter unit 340. In the determination data, the comparator 346 may determine the larger number of bit values between the first bit value and the second bit value as the final value and consider the smaller number of bit values as noise.

Although FIG. 3 illustrates that the number of touch slaves 310 is one, this is only for convenience of description and the number of touch slaves 310 may be two or more.

When the number of touch slaves 310 is two or more, the touch master 320 may simultaneously or individually control the two or more touch slaves 310.

The touch master 320 may be implemented as a Micro Control Unit (MCU).

Further, each touch slave 310 may be implemented as a touch IC, or an IC with the data driver 210.

The communication interface 330 may be arranged on a printed circuit board.

Referring to FIGS. 4 and 5, the filter unit 340 may be located between the touch slave 310 and the touch master 320.

The filter unit 340 may be included within the touch master 320.

As described above, in the touch sensing operation, the touch master 320 may sense the touch based on accurate sensing data (or determination data), input the accurate determination data by removing noise through the filter unit 340 arranged between the touch slave 310 and the touch master 320, and reduce the cost of a circuit component since a separate circuit component is not installed.

Figure 6:
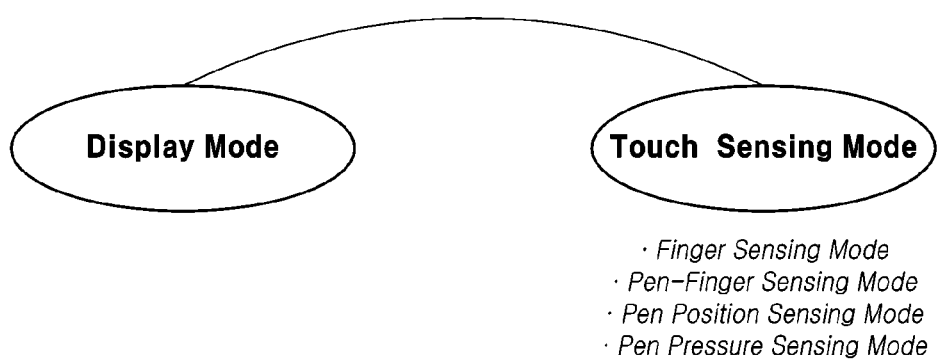
FIG. 6 illustrates two operation modes (a display mode and a touch sensing mode) of the touch display device according to the present disclosure.

FIG. 6 illustrates two operation modes of (a display mode and a touch sensing mode) of the touch display device according to the present disclosure.

Referring to FIG. 6, since the touch display device provides both an image display function and a touch sensing function, the touch display device may operate in both the display mode for displaying an image and the touch sensing mode for touch sensing.

The display mode and the touch sensing mode may be executed in temporally divided intervals.

For example, one frame interval is divided into one or more display mode intervals and one or more touch sensing mode intervals, in which the display mode and the touch sensing mode are alternately executed.

Meanwhile, the display mode and the touch sensing mode may be executed temporally at the same time.

Meanwhile, the touch display device according to the present disclosure may provide one or more touch sensing modes of a finger sensing mode for sensing a touch by a human body such as a human's finger, a pen sensing mode for sensing a touch (a touch location) by a pen such as an active pen, a pen-finger sensing mode for sensing both the touch by the human body such as the human's finger and the touch by the pen such as the active pen, and a pen pressure sensing mode for sensing touch pressure (pen pressure) by the pen such as the active pen.

The pen sensing mode may be also referred to as a pen position sensing mode.

Figure 7:
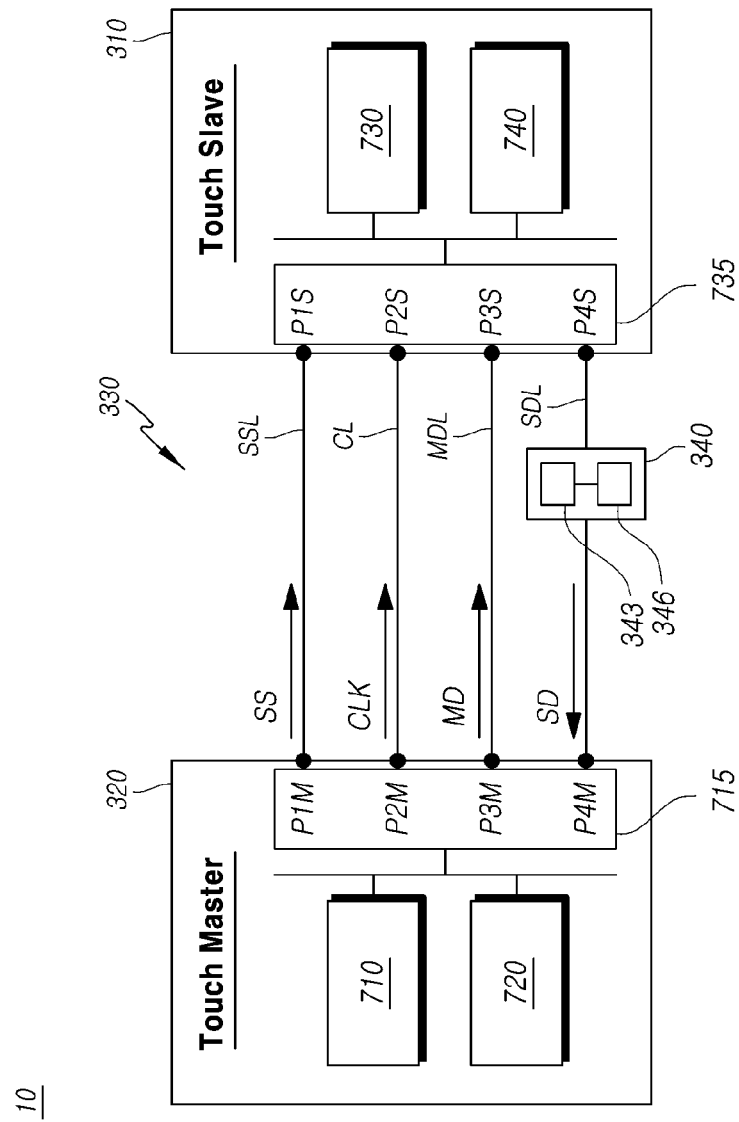
FIG. 7 illustrates a detailed diagram for a touch master, a touch slave, and a communication interface in a touch system according to the present disclosure.

FIG. 7 illustrates a detailed diagram for the touch master, the touch slave, and the communication interface in the touch system according to the present disclosure.

As illustrated in FIG. 7, the touch system 10 according to the present disclosure may be a master-slave system.

The touch slave 310 may sequentially supply touch driving signals (TDSs) to a plurality of touch electrodes (TEs) arranged on the touch screen panel (TSP) during a touch sensing interval (T) to receive sensing signals and may generate sensing data based on the sensing signals.

The touch master 320 may control the touch slave 310 and detect the existence or non-existence or a touch coordinate based on the sensing data generated by the touch slave 310.

As illustrated in FIG. 7, the touch system 10 according to the present disclosure includes the communication interface 330 for communication between the touch master 320 and the touch slave 310 to operate as the master-slave system.

Further, the touch system 10 may include the filter unit 340 for filtering a noise component in slave data output from the touch slave 310. As an example, an aspect of the disclosure in which the filter unit 340 is arranged between the touch master 320 and the touch slave 310 is described.

The filter unit 340 may include a sampler 343 for sampling bits in the slave data transmitted from the touch slave 310 and a count comparator 346 for counting and comparing the number of first bit values (0) and the number of second bit values (1) in the sampled bits and determining the first bit value or the second bit value as a final value based on a result of the comparison.

The communication interface 330 may include a Clock signal Line (CL) for transmitting a Clock Signal (CLK) to the touch slave 310 from the touch master 320, a Master Data Line (MDL) for transmitting Master Data (MD) to the touch slave 310 from the touch master 320, and a Slave Data Line (SDL) for transmitting Slave Data (SD) to the touch master 320 from the touch slave 310.

As described above, the touch system 10 may enable master-slave communication between the touch master 320 and the touch slave 310 through the communication interface 330 including the clock signal line (CL), the master data line (MDL), and the slave data line (SDL) so as to efficiently control the operation of the touch master 320 and the touch slave 310.

Further, through the arrangement of the filter unit 340 between the touch master 320 and the touch slave 310, the touch master 320 may efficiently read sensing data acquired as a result of touch driving of the touch slave 310. Accordingly, the touch master 320 may have a function of efficiently transmitting information and data related to the touch sensing operation due to the filter unit 340.

Referring to FIG. 7, through the master data line (MDL), the touch master 320 may synchronize and transmit the master data (MD) and the clock signal (CLK) transmitted through the clock signal line (CL).

Through the slave data line (SDL), the touch slave 310 may synchronize and transmit the slave data (SD) and the clock signal (CLK) transmitted through the clock signal line (CL).

As described above, the touch master 320 synchronizes and transmits the master data (MD) and the clock signal (CLK), so that the touch slave 310 may accurately read the master data (MD) transmitted from the touch master 320. Further, the touch slave 310 synchronizes and transmits the slave data (SD) and the clock signal (CLK), so that the touch master 320 may accurately read the slave data (SD) transmitted from the touch slave 310.

Meanwhile, referring to FIG. 7, the communication interface 330 may further include a Slave Select Signal Line (SSL) for outputting a Slave Select Signal (SS) for selecting the touch slave 310 for which the touch master 320 performs the touch sensing operation.

When the touch slave 310 is implemented by an integrated circuit (IC) chip, the slave select signal (SS) may be also referred to as a chip select signal, and in this case, the slave select signal line (SSL) may be also referred to as a chip select signal line.

According to the above description, the touch master 320 transmits the slave select signal (SS) indicating the touch slave 310 with which the touch master 320 communicates so as to selectively perform communication required for the touch sensing operation with the desired touch slave 310.

Hereinafter, the slave select signal (SS), the clock signal (CLK), the master data (MD), and the slave data (SD) will be described in more detail.

First, the slave select signal (SS) is a signal that indicates an interval in which a communication process (read process or write process) between the touch master 320 and the touch slave 310 and that has a meaning of selection of the touch slave 310.

The slave select signal may be, for example, a negative type signal.

In this case, the touch master 320 may transmit the slave select signal (S) having a low level to the touch slave 310 with which the touch master 320 desires to communicate.

The touch slave 310 may perform a communication process with the touch master 320 while receiving the slave select signal (SS) having the low level from the touch master 320.

The slave select signal may be a positive type signal.

In this case, the touch master 320 transmits the slave select signal (SS) having a high level to the touch slave 310 with which the touch master 320 desires to communicate.

The touch slave 310 performs a communication process with the touch master 320 while receiving the slave select signal (SS) having the high level from the touch master 320.

The master data (MD) refers to all pieces of data transmitted through the master data line (MDL).

The master data (MD) may include information required from communication with the touch slave 310 and information required for controlling the operation of the touch slave 310.

For example, the master data (MD) may include at least one of address information (memory address information (ADDR)) within the memory of the touch master 320 or the touch slave 310, command information (CMD) including various pieces of control information, and write data corresponding to data to be written in a slave memory 740.

The memory address information (ADDR) included in the master data (MD) may refer to a memory address indicating a location at which data (for example, sensing data) required by the touch master 320 is stored in the slave memory 740.

Alternatively, the memory address information (ADDR) may refer to a memory address indicating a location at which data required by the touch slave 310 is stored in a master memory 720.

The command information (CMD) included in the master data (MD) may include at least one piece of information for controlling the touch slave 310 and information required for communication between the touch master 320 and the touch slave 310.

Through the command information, the touch slave 310 may accurately perform the operation required for touch driving and sensing, and the communication between the touch slave 310 and the touch master 320 may be smoothly performed.

The command information (CMD) included in the master data (MD) may include information (R) indicating a read process or information (W) indicating a write process.

The read process is a communication process for reading data (read data) stored in the slave memory 740 of the touch slave 310 by the touch master 320, and may include all processes of outputting data by the touch slave 310 and receiving the data output from the touch slave 310 and storing the received data in the master memory by the touch master 320.

The read process may be, for example, a communication process used by the touch master 320 for reading sensing data that is generated through touch driving processing of the touch slave 310 and stored in the slave memory 740.

As described above, as the information (R) indicating the read process or the information (W) indicating the write process is included in the command information (CMD) transmitted from the touch master 320 to the touch slave 310 through the master data line (MDL), the touch slave 310 may accurately recognize what process between the two types of communication processes (read process and write process) related to the touch operation should be performed and may perform proper post processing suitable therefor.

The command information (CMD) included in the master data (MD) may include information indicating single data (S) or information indicating bulk data (B).

When the command information (CMD) includes the information indicating the read process (R) and the information indicating the single data (S), only a single third internal clock signal (CLK3) having successive pulses is included in the clock signal (CLK) during one interval in which the slave select signal (SS) is at the low level.

Figure 10:
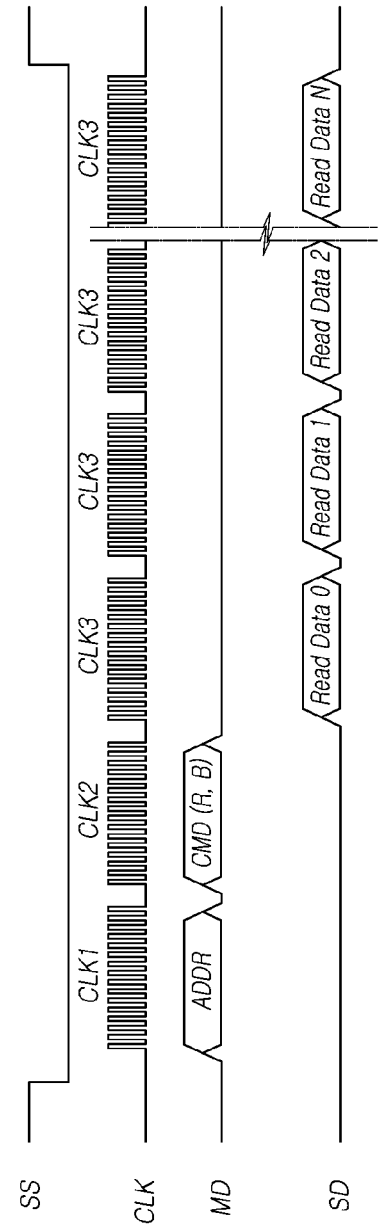

Accordingly, as illustrated in FIG. 10, the touch slave 310 may transmit read data corresponding to the slave data (SD) synchronized with the single third internal clock signal (CLK3) to the touch master 320.

When the command information (CMD) includes the information indicating the write process (W) and the information indicating the single data (S), only a single third internal clock signal (CLK3) having successive pulses is included in the clock signal (CLK) during one interval in which the slave select signal (SS) is at the low level.

Accordingly, the touch master 320 may transmit one piece of write data corresponding to the one piece of master data (MD) synchronized with the single third internal clock signal (CLK3) to the touch slave 310.

When the command information (CMD) includes the information indicating the read process (R) and the information indicating the bulk data (B), two or more third internal clock signals (CLK3) having successive pulses are included in the clock signal (CLK) during one interval in which the slave select signal (SS) is at the low level.

Accordingly, as illustrated in FIG. 10, the touch slave 310 may transmit N+1 pieces of read data (Read Data 0, Read Data 1, . . . , and Read Data N) corresponding to N+1 pieces of slave data (SD) synchronized with N+1 third internal clock signals (CLK3) to the touch master 320.

When the command information (CMD) includes the information indicating the write process (W) and the information indicating the bulk data (B), two or more third internal clock signals (CLK3) having successive pulses are included in the clock signal (CLK) during one interval in which the slave select signal (SS) is at the low level.

Accordingly, as illustrated in FIG. 10, the touch master 320 may transmit N+1 pieces of write data (Write Data 0, Write Data 1, . . . , and Write Data N) corresponding to N+1 pieces of master data (MD) synchronized with N+1 third internal clock signals (CLK3) to the touch slave 310.

As described above, the form of data (single data or bulk data) transmitted between the touch master 320 and the touch slave 310 may be provided from the touch master 320 to the touch slave 310. Accordingly, data transmission processing related to the touch sensing operation between the touch master 320 and the touch slave 310 may be smoothly performed.

The slave data (SD) refers to all pieces of data transmitted through the slave data line (SDL).

The slave data (SD) may include read data to be read from the slave memory 740 and an interrupt request (IRQ) made by the touch slave 310.

The read data may include, for example, sensing data generated through touch driving of the touch slave 310.

The clock signal (CLK) is a signal required for synchronization of various pieces of information and data transmitted through the master data line (MDL) and the slave data line (SDL) and may include a first internal clock signal (CLK1), a second internal clock signal (CLK2), and a third internal clock signal (CLK3).

The first internal clock signal (CLK1) may indicate a transmission interval of memory address information (ADDR) transmitted through the master data line (MDL).

The second internal clock signal (CLK2) may indicate a transmission interval of command information (CMD) related to the touch sensing operation transmitted through the master data line (MDL).

The third internal clock signal (CLK3) may indicate a transmission interval of write data transmitted through the master data line (MDL) or read data transmitted through the slave data line (SDL).

As described above, through the use of the clock signals (CLKs) including three sub-clock signals (CLK1, CLK2, and CLK3), the touch slave 310 may accurately receive and recognize the command information (CMD) and the memory address (ADDR) included in the master data (MD) transmitted from the touch master 320.

Further, the touch master 320 may accurately receive and recognize the slave data (SD) including the read data corresponding to the sensing data transmitted from the touch slave 310.

In addition, when the read process in which the touch slave 310 transmits data (slave data including read data) to the touch master 320 is performed, the touch system 10 within the touch display device according to the present disclosure may provide a communication method of checking if the data is properly transmitted to the touch master 320.

The read process in which the touch slave 310 transmits the data (slave data) to the touch master 320 may be a process in which the touch master 320 reads data stored in the slave memory 740 of the touch slave 310 or a process in which the touch slave 310 writes data (master data) in the master memory 720 of the touch master 320.

As described above, the touch system 10 according to the present disclosure may provide a communication method by which the data of the touch slave 310 is filtered by the filter unit 340 and thus accurate data is transmitted to the touch master 320.

Accordingly, while the data input from the touch slave 310 may be the same as the sampling data of the sampler 343, the data input into the touch master 320 from the filter unit 340 through the count comparator 346 may be different from the sampling data.

More specifically, the touch slave 310 transmits input data generated by sensing applied pressure due to a touch, that is, master data to the filter unit 340. The filter unit 340 may include the sampler 343 and the count comparator 346. The master data (MD) input into the touch slave 310 may be input into the sampler 343, and the sampler 343 may output the input data of the touch slave 310 as sampling data.

Further, the sampling data output from the sampler 343 may be input into the count comparator 346. The count comparator 346 may determine determination data by comparing the sampling data.

In a detailed example, the touch sensing data of the touch slave 310 may be input into the filter unit 340, and the touch sensing data may be input into the sampler 343 of the filter unit 340. The touch sensing data may switch to sampling data in the sampler 343.

The sampling data may secure a plurality of pieces of data by checking the data in a plurality of intervals. The number of pieces of sampling data may be an odd number, such as 3, 5, or 7. For example, data, such as a collected sampling data value [00111], may be input into the sampler 343. The collected sampling data value may be configured by a first bit and a second bit, wherein the first bit may be expressed by "0" and may indicate a region in which touch sensing has not been performed, and the second bit may be expressed by "1" and may indicate a region in which touch sensing has been performed.

The collected sampling data value may be input into the count comparator 346, and the count comparator 346 may generate determination data [1] having a high input frequency by comparing the collected sampling data. The first bit of "0" of lower input frequency may be considered as noise.

The determination data may be transmitted from the filter unit 340 to the touch master 320 through the communication interface 330.

In other words, the filter unit 340 may transmit determination data, which is the same as the determination data determined by the count comparator 346, to the touch master 320 through the communication interface 330.

When receiving the determination data, the touch master 320 operates by receiving a touch input signal through the received determination data.

More specifically, the touch slave 310 may transmit determination data, which is different from the master data (MD) received from the touch master 320, to the touch master 320 through the filter unit 340. Here, between the touch slave 310 and the filter unit 340, and the filter unit 340 and the touch master 320, input data may be transmitted through the communication interface 330.

According to the processing scheme described above, the touch master 320 transmits the master data (MD) to the touch slave 310, and the touch slave 310 transmits the slave data (SD) to the filter unit 340. The filter unit 340 may filter noise of the slave data (SD) and transmit determined data to the touch master 320.

Accordingly, in the touch sensing operation, the touch master 320 may sense the touch based on accurate sensing data (or determination data) and is not required to install a separate circuit component for removing noise through the filter unit 340 arranged between the touch slave 310 and the touch master 320, so as to reduce circuit component costs.

Hereinafter, the configuration of each of the touch master 320 and the touch slave 310 will be described.

The touch master 320 according to the present disclosure will be first described with reference to FIG. 7.

Referring to FIG. 7, the touch master 320 may include a core 710 for managing the function of the touch master 320, a master memory 720 for storing various pieces of data and information, and a master interface unit 715 for communicating with the touch slave 310 through the communication interface 330.

Referring to FIG. 7, the master interface unit 715 may include a clock signal port (P2M) connected to the clock signal line (CL) for transmitting the clock signal (CLK) to the touch slave 310, a master data port (P3M) connected to the master data line (MDL) for transmitting master data (MD) to the touch slave 310, and a slave data port (P4M) connected to the slave data line (SDL) for receiving slave data (SD) transmitted from the touch slave 310.

The master memory 720 within the touch master 320 may store sensing data, which is the slave data (SD) received through the slave data port (P4M).

The master memory 720 may further store various pieces of information and data required for controlling the operation of the touch slave 310 or the touch sensing operation as well as the slave data (SD) received through the slave data port (P4M).

The core 710 in the touch master 320 may manage the function of the touch master 320, that is, control the operation of the internal elements 715 and 720.

The core 710 may detect the existence or non-existence of the touch or a touch coordinate (i.e., touch location) based on the sensing data stored in the memory 720.

As described above, the touch master 320 corresponding to the touch controller, which can efficiently interwork with the touch slave 310 corresponding to the touch driving device, may be provided.

Referring to FIG. 7, the touch master 320 may further include a slave select signal port (P1M) connected to the slave select signal line (SSL) for transmitting the slave select signal (SS) to the touch slave 310 to select the touch slave 310.

As described above, the touch master 320 may effectively control two or more touch slaves 310 and smoothly communicate with the two or more touch slave 310.

Meanwhile, when the touch system 10 performs processing related to the touch operation (touch driving operation or touch sensing operation) in a normal mode, the core 710 of the touch master 320 should control procedures and timings of various processing related to the touch operation at the center.

Unlike this, when the touch system 10 performs processing related to the touch operation (touch driving operation or touch sensing operation) in an interrupt mode, the core 710 of the touch master 320 does not need to control procedures and timings of various processing related to the touch operation at the center.

That is, in the interrupt mode, various processing related to the touch operation may be performed according to a predetermined operation procedure of the interface unit 720 without involvement of the core 710 of the touch master 320.

As described above, in the normal mode, since the interface unit 720 should perform various processing related to the touch operation by receiving instructions from the core 710 through access to the core 710 and internal communication with the core 710, a long processing time (access time) and many resources (core or the like) are needed.

On the other hands, in the interrupt mode, since the interface unit 720 performs various processing related to the touch operation without involvement of the core 710, the processing time can be reduced and required resources are also reduced.

As described above, the touch master 320 transmits the master data (MD) to the touch slave 310 and the touch slave 310 receives determination data generated by filtering noise data through the filter unit 340, so that it is possible to prevent malfunction due to noise and stably process a high-speed signal.

Hereinafter, the touch slave 310 according to the present disclosure will be described with reference to FIG. 7.

Referring to FIG. 7, each touch slave 310 included in the touch system 10 according to the present disclosure may include a slave interface unit 735 for communicating with the touch master 320 through the communication interface 330, a touch driving processor 730 for performing touch driving processing, and a slave memory 740 for storing touch sensing data generated through touch driving processing as the slave data (SD).

The touch driving processor 730 may sequentially supply touch driving signals (TDSs) to a plurality of touch electrodes (TEs) arranged on the touch screen panel (TSP) during a touch sensing interval (T) to receive sensing signals and may generate sensing data based on the sensing signals.

The slave memory 740 may store sensing data generated through the touch driving processing by the touch driving processor 730 as the slave data (SD).

Further, the slave memory 740 may further store various pieces of information and data provided by the touch master 320.

Referring to FIG. 7, the slave interface unit 735 may include a clock signal port (P2S) connected to the clock signal line (CL) for receiving the clock signal (CLK) to the touch master 320, a master data port (P3S) connected to the master data line (MDL) for receiving master data (MD) from the touch master 320, and a slave data port (P4S) connected to the slave data line (SDL) for transmitting slave data (SD) corresponding to the sensing data to the touch master 320.

As described above, for touch driving and touch sensing, the touch slave 310 corresponding to the touch driving device, which can efficiently interwork with the touch master 320, may be provided.

Referring to FIG. 7, the slave interface unit 735 of the touch slave 310 may further include a slave select signal port (P1S) connected to the slave select signal line (SSL) for receiving the slave select signal (SS) from the touch master 320 to select the touch slave 310.

As described above, in the touch system 10 including two or more touch slaves 310, the touch slave 310 capable of efficiently performing touch driving processing under a control of the touch master 320 may be provided.

Meanwhile, while receiving master data (MD) output from the touch master 320 through the master data port (P3M), the slave interface unit 735 of the touch slave 310 may output data, which is the same as the received master data (MD), through the salve data port (P4S) and input the data, which is the same as the master data (MD) provided from the slave data port (P4S), into the filter unit 340.

Here, the master data (MD) may correspond to data for controlling the operation of the touch slave 310 and may include memory address information, command information, and write data.

The determination data of the filter unit 340 described above may be used for performing stable touch driving processing since accurate data is input into the touch master 320.

Meanwhile, the slave interface unit 735 of the touch slave 310 may output the slave data (SD) through the slave data port (P4S) and thus some noise may be generated while the slave data (SD) is transmitted to the touch master 320.

The filter unit 340 may remove the generated noise and receive the accurate input data through the master data port (P4M).

Here, the slave data (SD) may include, for example, read data corresponding to sensing data acquired by the touch slave 310 through the touch driving.

Figure 8:
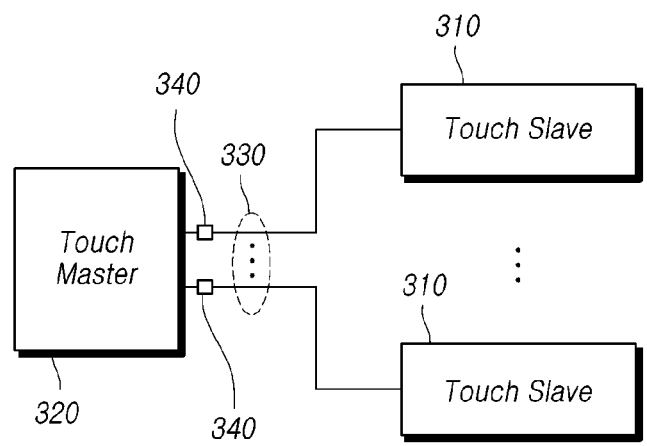
FIG. 8 illustrates the touch system including a plurality of touch slaves according to the present disclosure.

FIG. 8 illustrates the touch system 10 including a plurality of touch slaves 310 according to the present disclosure.

As illustrated in FIG. 8, the touch system 10 may include two or more touch slaves 310.

In this case, the touch master 320 may select the touch slave 310 to communicate among the two or more touch slaves 310 and use the slave select signal (SS) in order to inform the selected touch slave 310 of the selection matters.

The touch master 320 may communicate with one, two or more, or all of the two or more touch slaves 310 at any moment.

Here, the filter unit 340 may be arranged between the touch master 320 and the two or more touch slaves 310. The filter unit 340 may be arranged between each touch slave 310 and the touch master 320. Although FIG. 8 illustrates that the filter unit 340 is arranged between each touch slave 310 and the touch master 320, the filter unit 340 for a combination of the plurality of touch slaves 310 may be arranged.

Figure 9:
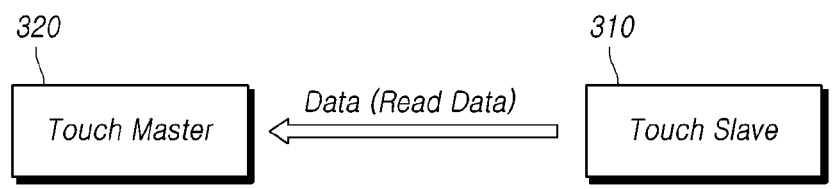
FIGS. 9 to 11 illustrate a read process between the touch master and the touch slave according to the present disclosure.
Figure 11:
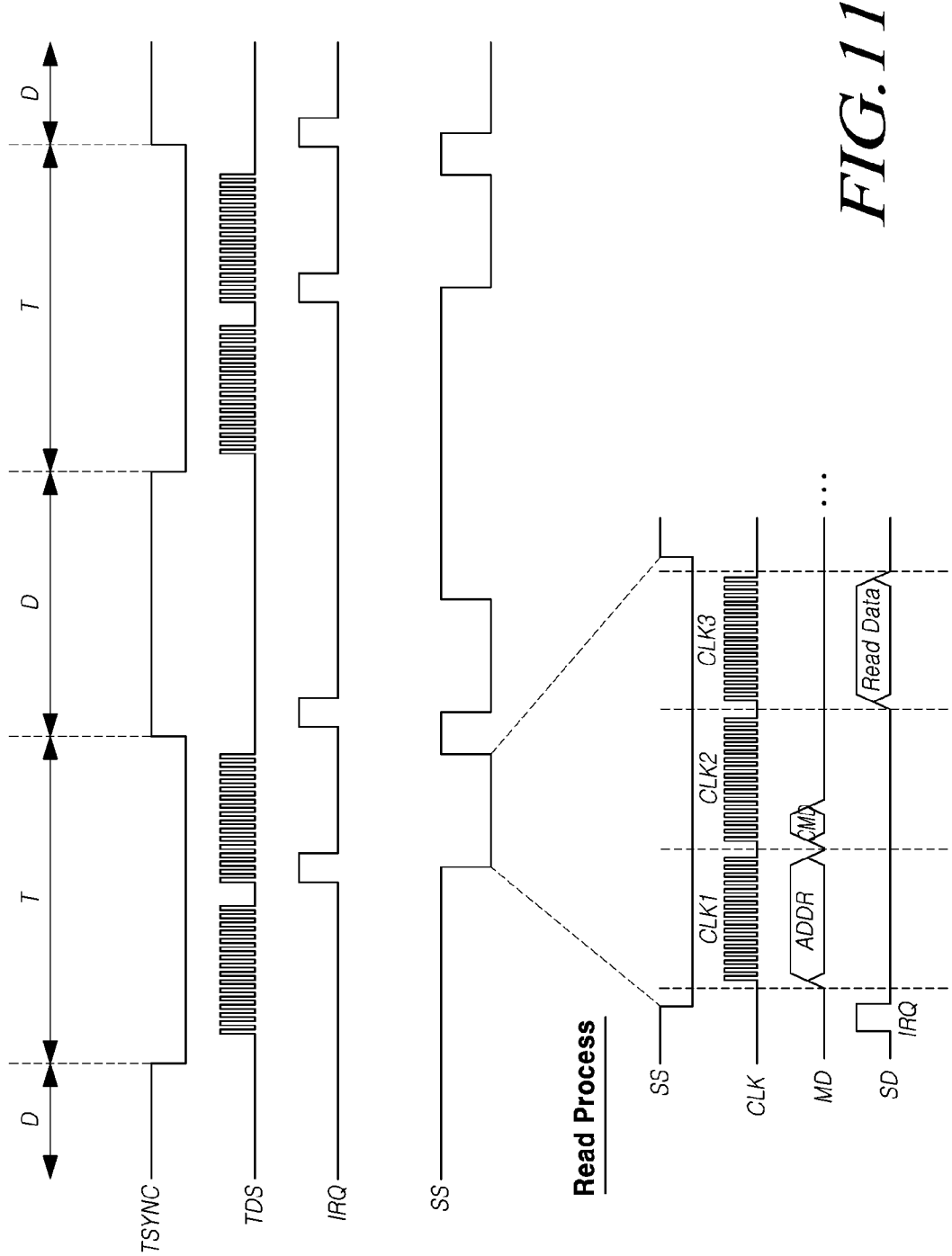

FIGS. 9 to 11 illustrate a read process between the touch master 320 and the touch slave 310 according to the present disclosure.

Referring to FIG. 9, the read process is a communication process in which the touch master 320 reads data (read data) stored in the slave memory 740 of the touch slave 310.

During the read process, the slave data (SD) including the read data is transmitted from the touch slave 310 to the touch master 320.

More specifically, during the read process, the touch slave 310 may output the slave data (SD) including the read data, and the touch master 320 may receive the slave data (SD) output from the touch slave 310 and store the received slave data (SD) in the master memory 720.

For example, the read process may be used for reading sensing data, which has been generated through touch driving processing of the touch slave 310 and stored in the slave memory 740 by the touch master 320.

The read process corresponding to the communication process between the touch master 320 and the touch slave 310 will be described in more detail with reference to FIG. 10.

The touch master 320 transmits (outputs) the slave select signal (SS) changed to a voltage state (for example, a low level) in which the communication process can be performed to the corresponding touch slave 310 through the slave select signal line (SSL).

Accordingly, the touch master 320 may transmit (output) the clock signals (CLKs) sequentially including a first internal clock signal (CLK1), a second internal clock signal (CLK2), and a third internal clock signal (CLK3) through the clock signal line (CL).

Through the master data line (MDL), the touch master 320 may synchronize memory address information (ADDR) with the first internal clock signal (CLK1) and transmit (output) the synchronized first internal clock signal (CLK1).

Through the master data line (MDL), the touch master 320 may synchronize command information (CMD) including information (R) indicating the read process with the second internal clock signal (CLK2) and transmit (output) the synchronized second internal clock signal (CLK2).

Through the slave data line (SDL), the touch slave 310 may synchronize slave data (SD) including read data with the third internal clock signal (CLK3) and transmit the synchronized third internal clock signal (CLK3).

In the example of FIG. 10, the command information (CMD) included in the master data (MD) transmitted by the touch master 320 includes information indicating bulk data (B).

Accordingly, during an interval in which the slave select signal (SS) is at a low level, the touch slave 310 may synchronize two or more pieces of read data (Read Data 0, Read Data 1, . . . , and Read Data N) with two or more third internal clock signals (CLK3) and transmit the synchronized third internal clock signals (CLK3).

Referring to FIG. 11, during the read process, the master data (MD) transmitted through the master data line (MDL) may include memory address information (ADDR) and command information (CMD).

Referring to FIG. 11, during the read process, the slave data (SD) transmitted through the slave data line (SDL) may include read data.

FIG. 11 illustrates an example of the application of the read process between the touch master 320 and the touch slave 310 according to the present disclosure.

As described above, the read process may be used to transmit sensing data acquired through the touch driving to the touch master 320 from the touch slave 310.

However, it is assumed that the read process in which the touch slave 310 transmits sensing data acquired through the touch driving to the touch master 320 is performed in the interrupt mode.

When the display mode and the touch sensing mode are executed in a display interval (D) and a touch sensing interval (T) that are temporally divided, the display interval (D) and the touch sensing interval (T) may be controlled by a touch synchronization signal (TSYNC).

For example, the touch synchronization signal (TSYNC) at a high level may correspond to the display interval (D), and the touch synchronization signal (TSYNC) at a low level may correspond to the touch sensing interval (T).

The touch synchronization signal (TSYNC) may be output by the controller 30.

The display driving system 20 may perform display driving when the touch synchronization signal (TSYNC) output by the controller 30 is at the high level, and the touch system 10 may perform touch driving and touch sensing operations when the touch synchronization signal (TSYNC) output by the controller 30 is at the low level.

During the touch sensing interval (T), the touch slave 310 of the touch system 10 outputs a touch driving signal (TDS) for sequentially driving at least one of a plurality of touch electrodes (TEs).

The touch driving signal (TDS) may be a pulse type signal such as a Pulse Width Modulation (PWM) signal.

When the touch slave 310 of the touch system 10 outputs the touch driving signal (TDS) for sequentially driving at least one of the plurality of touch electrodes (TEs) to compete the touch sensing for the corresponding sensing area (entire or some areas of the touch screen panel (TSP) during the touch sensing interval (T) and generate sensing data, an interrupt request (IRQ) may be generated.

In the case in which, through touch driving for one touch electrode (TE), sensing data for the corresponding touch electrode (TE) is generated, in the case in which, through touch driving for two or more touch electrodes (TEs) within a predetermined touch electrode group, sensing data for the corresponding touch electrode group is generated, or in the case in which, through touch driving for all touch electrodes (TEs), sensing data for all touch electrodes (TEs) is generated, the touch sensing may be considered as being completed, and the generated sensing data may be stored in the slave memory 740 according to the touch sensing completion.

The touch slave 310 may output the interrupt request (IRQ) to the slave data line (SDL) when touch sensing is completed. Accordingly, the interrupt mode may be initiated.

The touch master 320 receives the interrupt request (IRQ) through the slave data line (SDL).

The touch master 320 may identify the interrupt request (IRQ) to output the slave select signal (SS) changed o the voltage state (for example, the low level or the high level), at which the corresponding read process is actually performed, to the slave select signal line (SSL).

Meanwhile, during the read process, noise may flow in the communication path. Accordingly, data transmitted during the communication process may have an error.

The noise flowing in the communication path may be generated by, for example, foreign materials, moisture, or static electricity in the device (for example, integrated circuit board) on which the communication interface 330 is arranged, the touch master 320, or the touch slave 310.

Figure 12:
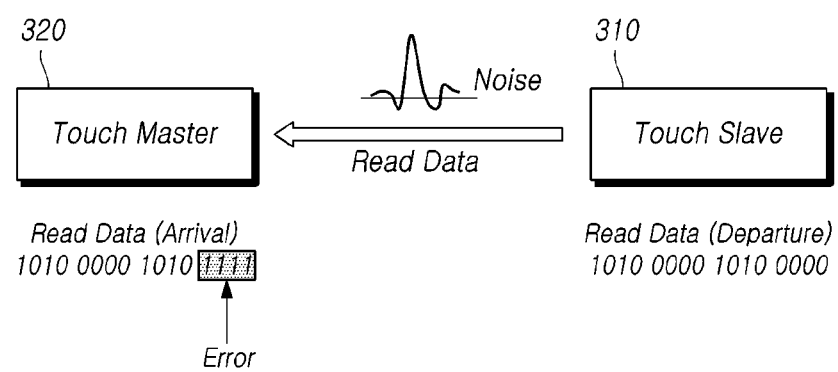
FIG. 12 illustrates a data transmission error that may be caused during the read process according to the present disclosure.

FIG. 12 illustrates a data transmission error that may be generated during the read process according to the present disclosure.

Referring to FIG. 12, when the communication state is not normal due to the inflow of noise during the read process, read data having a bit error (that is, data transmission error) may be transmitted. Accordingly, the touch slave 310 cannot accurately perform the touch sensing operation, which the touch master 320 desires, and thus the touch sensing error may be generated.

Referring to FIG. 12, when the touch slave 310 transmits slave data (SD) including read data to the touch master 320 through the slave data line (SDL), the touch slave 310 outputs read data of 16 bits corresponding to "1010 0000 1010 0000", but the touch master 320 may receive other read data of 16 bits corresponding to 1010 0000 1010 1111 different from "1010 0000 1010 0000" due to noise of the slave data line (SDL).

As described above, when the communication state is not normal due to the inflow of noise during the read process, read data having the bit error (data transmission error) may be transmitted, and accordingly, the touch master 320 may detect the existence or non-existence of a touch and/or a touch location based on the read data having the bit error (data transmission error), that is, sensing data having the error, so that the touch sensing result may have an error.

Accordingly, the present disclosure may provide a method of checking whether the data transmission error is generated during the read process and a method of solving the data transmission error according to a result of the check.

Figure 13:
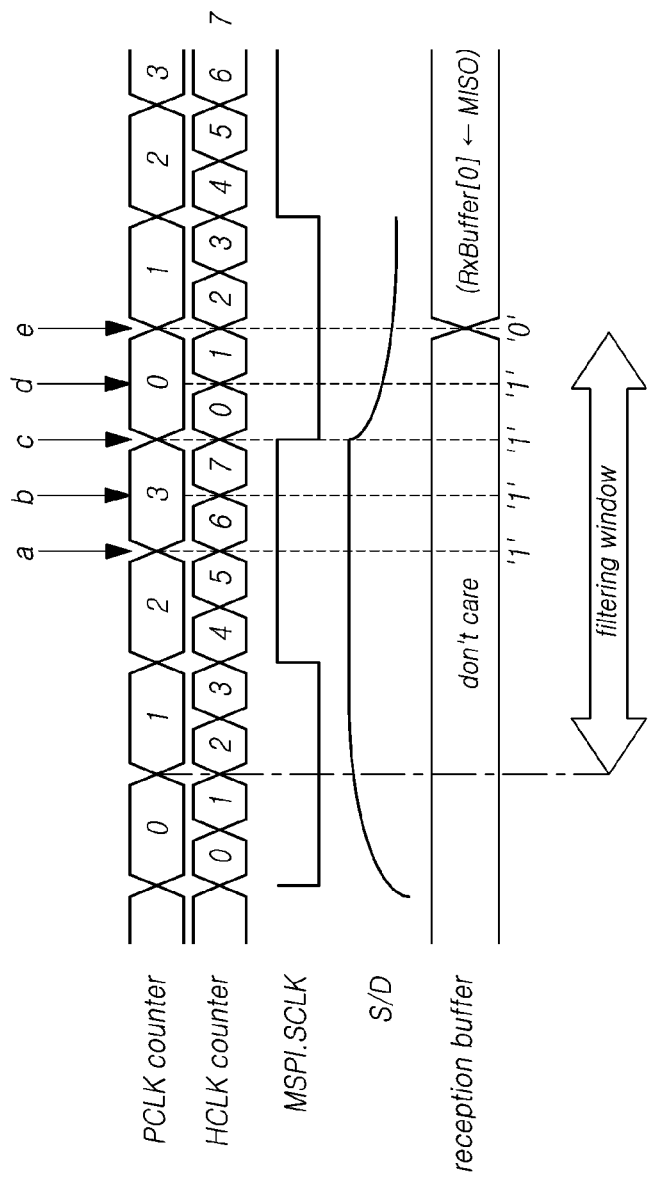
FIG. 13 illustrates a method of removing noise in the touch system according to the present disclosure.

FIG. 13 illustrates a method of removing noise in the touch system according to the present disclosure.

Referring to FIG. 13, noise of the slave data (SD) transmitted from the touch slave 310 may be removed through the filter unit 340.

Accordingly, when the voltage state (for example, low level) indicating the progressed process state is maintained during the read process and then the read process is completed, the slave select signal (SS) is changed to a voltage state (for example, high level) indicating the non-progressed process state.

Further, the slave select signal (SS) is changed back to the voltage state (for example, low level) indicating the progressed-process state, at which the check process is performed, and remains in the voltage state (for example, low level) indicating the progressed process state during the check process.

Referring to FIG. 13, sampling data is input into the count comparator 346 in a predefined filter window interval. With respect to the sampled data input into the count comparator 346 in the filter window interval, the count comparator 346 may compare a plurality of pieces of sampling data and generate determination data.

Sampling locations (a, b, c, d, e) may be defined in the filter window interval. When the sampling locations (a, b, c, d, e) are defined and a variable region of the slave data is assumed as c, the locations (a, b, c, d, e) at which the bits are sampled in the slave data may include only one location (c) at which the bit value is changed based on clock information.

Figure 14:
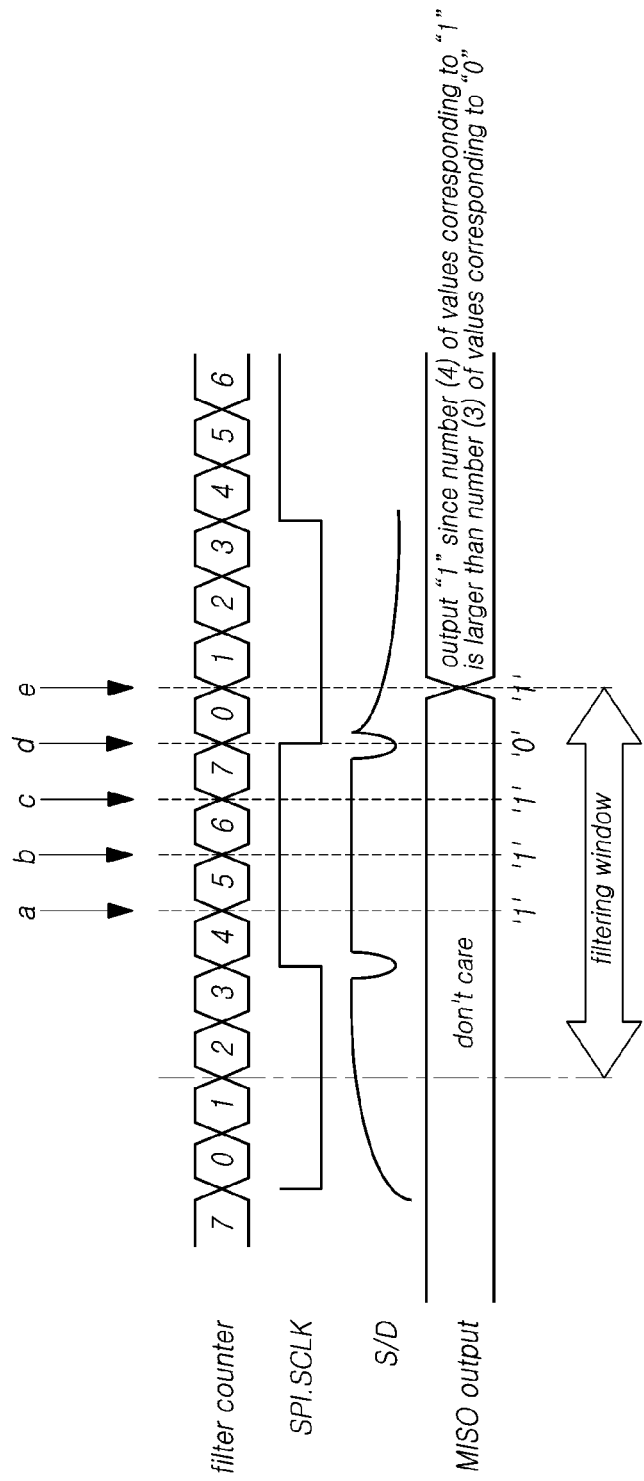
FIG. 14 illustrates a method of removing noise in the touch system according to another aspect of the present disclosure.

The slave data (SD) may be input into the filter unit 340. The sampler 343 may have at least three sampling regions. Referring to FIG. 14, for example, the bits may be sampled to the second bit ("1") at the locations a, b, and c, and may be sampled to the first bit ("0") at the locations d and e.

The sampling value at each location may be input into the count comparator 346. The count comparator 346 may read [11100]. Accordingly, the count comparator 346 may read three "1" and two "0" and extract "1" corresponding to the second bit value of higher frequency as determination data. Further, the extracted data is transmitted to the touch master 320. Here, the extracted first bit of "0" may be considered as noise and thus removed.

The sampling data may secure a plurality of pieces of data by checking the data in a plurality of intervals. The number of pieces of sampling data may be an odd number, such as 3, 5, or 7. For example, data, such as a collected sampling data value [00111], may be input into the sampler 343. The collected sampling data value may be configured by a first bit and a second bit, wherein the first bit may be expressed by "0" and may indicate an area in which touch sensing has not been performed, and the second bit may be expressed by "1" and may indicate an area in which touch sensing has been performed.

The collected sampling data value may be input into the count comparator 346, and the count comparator 346 may generate determination data [1] having a high input frequency by comparing the collected sampling data. The first bit of "0" of lower input frequency may be considered as noise.

As described above, in the touch sensing operation, the touch master 320 may sense the touch based on accurate sensing data (determined data), input the accurate determined data by removing noise through the filter unit 340 arranged between the touch slave 310 and the touch master 320, and reduce the cost of a circuit component since a separate circuit component is not installed.

FIG. 14 illustrates the method of removing noise in the touch system according to another aspect of the present disclosure.

Referring to FIG. 14, sampling data is input into the count comparator 346 in a predefined filter window interval. With respect to the sampled data input into the count comparator 346 in the filter window interval, the count comparator 346 may compare a plurality of pieces of sampling data and generate determination data.

Here, the filter window interval may be shifted to a region in which noise is generated. Locations (a, b, c, d, e) at which bits are sampled in slave data (SD) may be shifted such that the number of locations before the location (d) at which the bit value is changed becomes larger than the number of locations after the location (d) at which the bit value is changed.

As described above, through the shift such that the number of locations before the location (d) at which the bit value is changed becomes larger than the number of locations after the location (d) at which the bit value is changed, initial touch input data may be accurately recognized and the generation of touch errors may be minimized.

Figure 15:
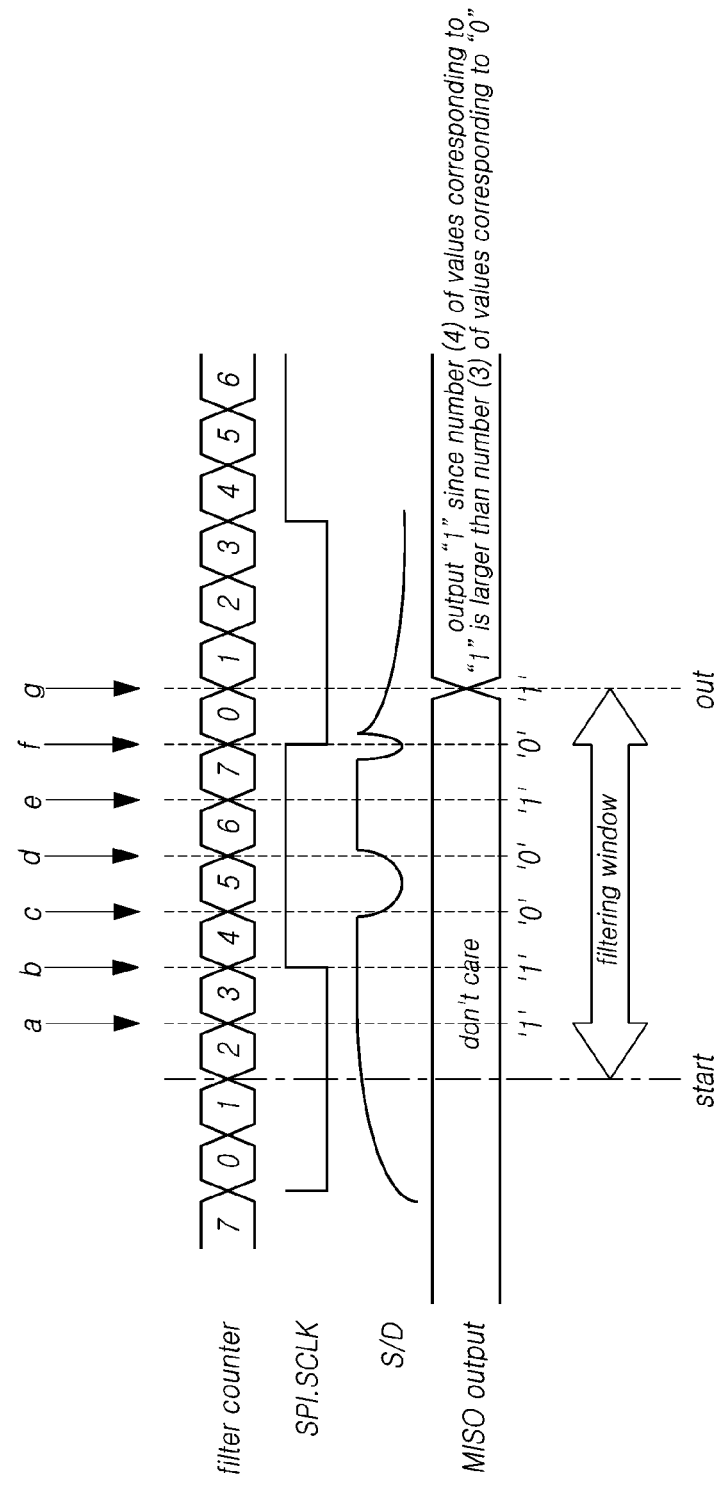
FIG. 15 illustrates a method of removing noise in the touch system according to yet another aspect of the present disclosure.

FIG. 15 illustrates the method of removing noise in the touch system according to yet another aspect of the present disclosure.

Referring to FIG. 15, it is possible to minimize an error due to noise by increasing the number of sampling locations.

That is, an error in touch sensing due to noise can be minimized by increasing the sampling locations to increase the number of samplings.

Figure 16:
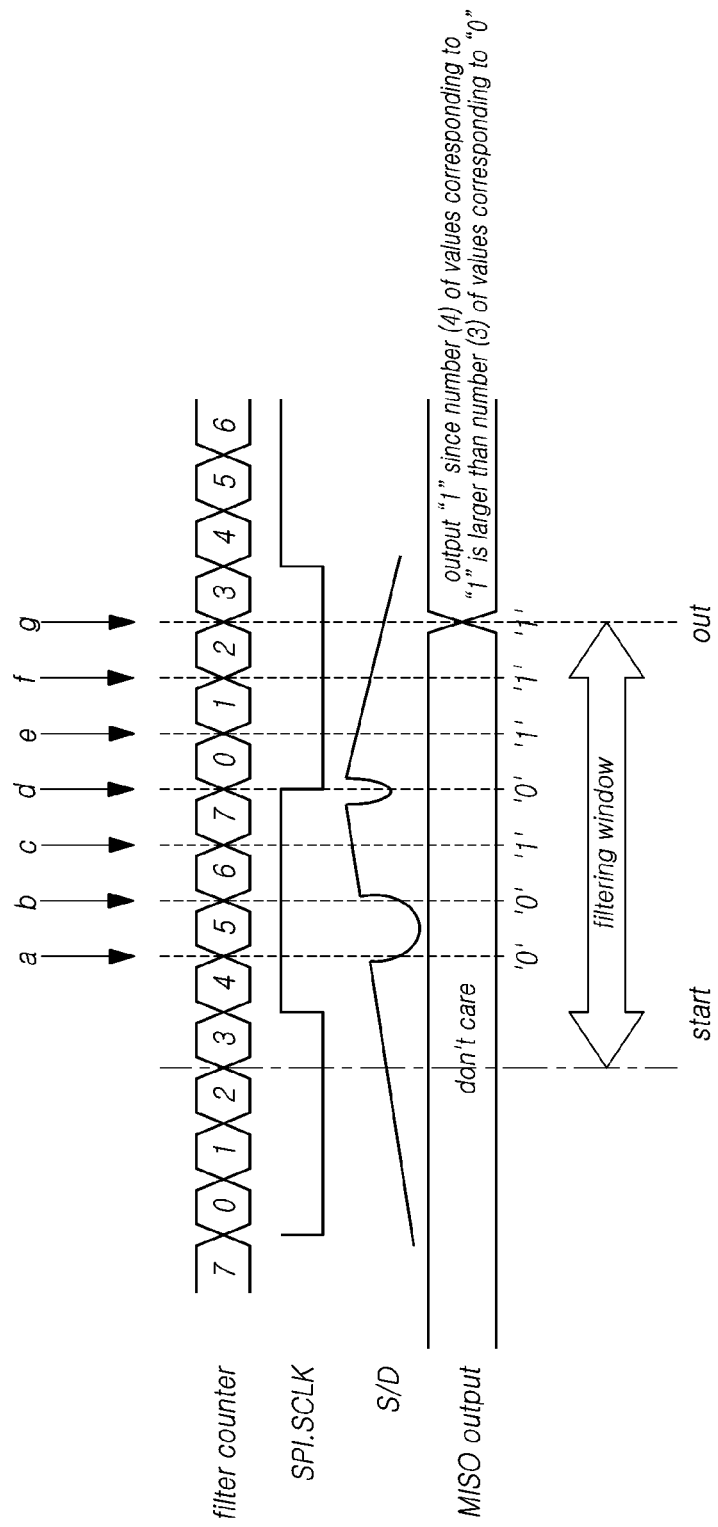
FIG. 16 illustrates a method of removing noise in the touch system according to still yet another aspect of the present disclosure.

FIG. 16 illustrates the method of removing noise in the touch system according to still yet another aspect of the present disclosure.

Here, the filter window interval may be shifted to a region in which noise is generated. Locations (a, b, c, d, e) at which bits are sampled in slave data (SD) may be shifted such that the number of locations before the location (d) at which the bit value is changed becomes the same as the number of locations after the location (d) at which the bit value is changed.

When the number of locations before the location (d) at which the bit value is changed becomes the same as the number of locations after the location (d), the filter window interval may be shifted to a region in which noise is intensively generated.

By shifting the filter window interval to the region of higher frequency of noise, a noise removal probability can be increased, thereby reducing operational errors. Further, by increasing the number of samplings in the region in which noise is intensively generated, input data errors caused by noise can be minimized.

Figure 17:
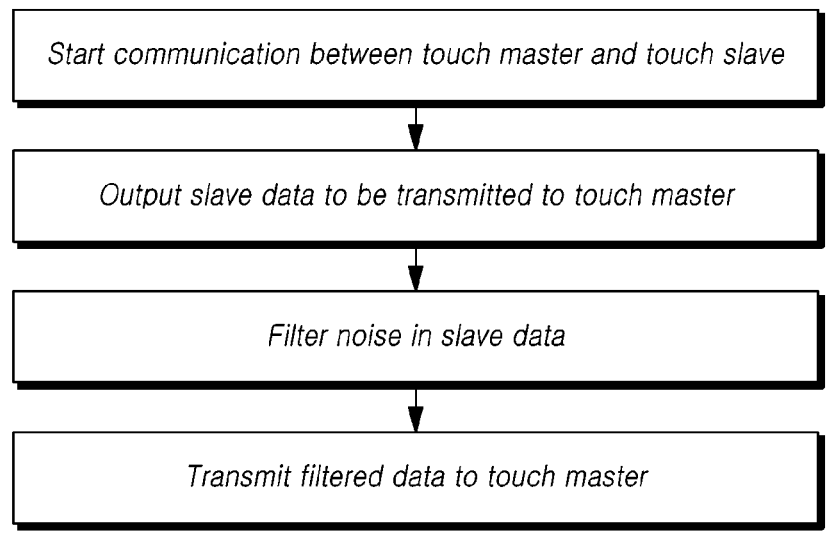
FIG. 17 is a flowchart illustrating a communication method of the touch system according to an aspect of the present disclosure.

FIG. 17 is a flowchart illustrating a communication method of the touch system according to an aspect of the present disclosure.

Referring to FIG. 17, the touch master 320 and the touch slave 310 start communication therebetween.

The touch slave 310 outputs slave data (SD) to be transmitted to the touch master 320. Here, the slave data (SD) may be a touch input by the user.

Noise is filtered from the slave data (SD) output from the touch slave 310.

A process of filtering noise will be described in detail with reference to FIG. 18.

The filtered data is transmitted to the touch master 320. The filtered data may be slave data different from or the same as the slave data input into the touch slave. When the slave data is the same as the filtered data, noise may not occur. However, the case, in which noise does not occur, hardly exists.

Accordingly, due to noise generated and removed by the step of removing noise, the case in which the slave data and the filtered data are different from each other may somewhat exist.

Figure 18:
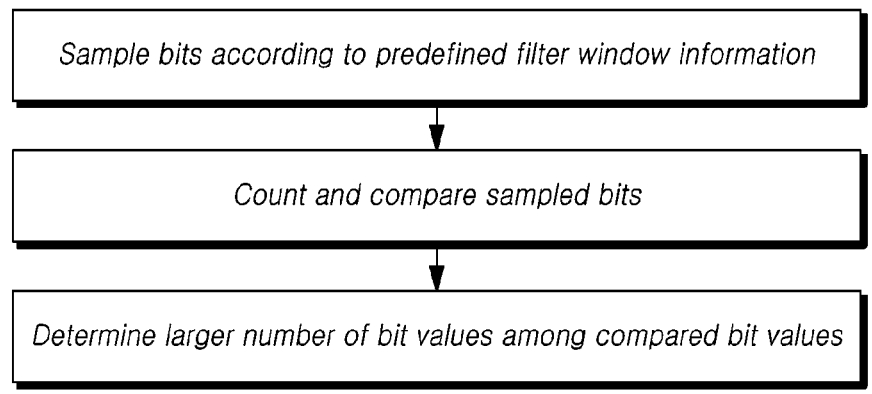
FIG. 18 is a flowchart illustrating a method of removing noise of the touch system according to an aspect of the present disclosure.

FIG. 18 is a flowchart illustrating a method of removing noise of the touch system according to an aspect of the present disclosure. FIG. 18 will be described with reference to FIG. 17.

Referring to FIG. 18, in the filtering step, a step of sampling bits in the slave data according to predefined filter window information may be performed.

A step of counting and comparing the number of first bit values (0) and the number of second bit values (1) in the sampled bits and determining the first bit value or the second bit value as a final value based on a result of the comparison may be included.

More specifically, referring to FIG. 7, when the touch slave 310 transmits the slave data (SD) to the touch master 320 through the slave data line (SDL) during the read process, the filter unit 340 may receive the slave data (SD) received through the slave data line (SDL) and transmit determination data which has been compared and determined by the filter unit.

The present disclosure as described above may provide the touch display device, the touch system 10, the touch master 320, and the communication method capable of accurately and rapidly performing communication between the touch driving device and the touch controller by providing a communication protocol and a communication interface based on a master-slave system in which the touch driving device operates as the touch slave and the touch controller operates as the touch master.

Further, the present disclosure may provide the touch display device, the touch system 10, the touch master 320, and the communication method capable of reducing a touch-related processing time and increasing data transmission efficiency.

In addition, the present disclosure may provide the touch display device, the touch system 10, the touch master 320, and the communication method capable of checking an error occurring in data transmission between the touch master and the touch slave and performing reliable data transmission therethrough.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the aspects disclosed in the present disclosure are intended to illustrate the scope of the technical idea of the present disclosure, and the scope of the present disclosure is not limited by the aspect. The scope of the present disclosure shall be construed on the basis of the accompanying claims in such a manner that all of the technical ideas included within the scope equivalent to the claims belong to the present disclosure.

What is claimed is:

1. A touch system comprising:
    a touch slave receiving sensing signals by supplying touch driving signals to a plurality of touch electrodes arranged on a touch screen panel, generating sensing data based on the sensing signals, and outputting the generated sensing data as slave data during a touch sensing interval;
    a touch master controlling the touch slave and detect an existence or a non-existence of a touch or a touch coordinate based on the sensing data received from the touch slave;
    a communication interface providing a communication path between the touch master and the touch slave; and
    a filter unit filtering a noise component in the slave data output from the touch slave,
    wherein the filter unit comprises:
    a sampler sampling bits in the slave data according to predefined filter window information; and a count comparator counting and comparing the number of first bit values of 0 and the number of second bit values of 1 in the sampled bits, and determining one of the first bit value and the second bit value as a final value based on a result of the comparison, wherein the predefined filter window information includes a number of bits for sampling range or window size to be sampled in the slave data or sampling locations at which the bits are sampled in the slave.

2. The touch system of claim 1, wherein the sampled bits in the slave data are odd-numbered.

3. The touch system of claim 1, wherein, a plurality of locations (a, b, c, d, e) at which bits are sampled in the slave data include only one location (c) at which a bit value is changed based on clock information.

4. The touch system of claim 1, wherein, in the plurality of locations (a, b, c, d, e) at which bits are sampled in the slave data, the number of locations before the location (c) at which the bit value is changed is larger than the number of locations after the location (c) at which the bit value is changed.

5. The touch system of claim 1, wherein the count comparator determines the larger number of bit values between the first bit value (0) and the second bit value (1) as the final value.

6. The touch system of claim 1, wherein the filter unit is included in the touch master.

7. The touch system of claim 1, wherein the filter unit is located between the touch slave and the touch master.

8. The touch system of claim 1, further comprising:
a clock signal line transmitting a clock signal from the touch master to the touch slave;
a master data line transmitting master data from the touch master to the touch slave; and
a slave data line transmitting slave data from the touch slave to the touch master.

9. The touch system of claim 8, wherein the touch slave transmits data of the filter unit received through the salve data line to the touch master through the master data line while the touch slave transmits the salve data to the touch master through the slave data line.

10. The touch system of claim 8, wherein the touch master synchronizes the master data with the clock signal and transmits the synchronized master data and clock signal through the master data line, and the touch slave synchronizes the salve data with the clock signal and transmits the synchronized slave data and clock signal through the slave data line.

11. A communication method of a touch system, comprising:
starting communication between a touch master and a touch slave;
outputting slave data to be transmitted to the touch master from the touch slave; and
filtering noise in the salve data output from the touch slave,
wherein the filtering of the noise comprises:
sampling bits in the slave data according to predefined filter window information; and
counting and comparing the number of first bit values of 0 and the number of second bit values of 1 in the sampled bits, and determining one of the first bit value and the second bit value as a final value based on a result of the comparison,
wherein the predefined filter window information includes a number of bits for sampling range or window size to be sampled in the slave data or sampling locations at which the bits are sampled in the slave.

12. The communication method of claim 11, wherein sampled bits in the slave data are odd-numbered.

13. The communication method of claim 11, wherein a plurality of locations (a, b, c, d, e) at which bits are sampled in the slave data includes only one location (c) at which the bit value is changed based on clock information.

14. The communication method of claim 11, wherein, in the plurality of locations (a, b, c, d, e) at which bits are sampled in the slave data, the number of locations before the location (c) at which the bit value is changed is larger than the number of locations after the location (c) at which the bit value is changed.

15. The communication method of claim 11, wherein the final value is a larger number of bit values one of the first bit value of 0 and the second bit value of 1.

16. A touch display device comprising:
a touch screen panel on which a plurality of touch electrodes are arranged;
a touch slave receiving sensing signals by supplying touch driving signals to the plurality of touch electrodes arranged on the touch screen panel, generating sensing data based on the sensing signals, and outputting the generated sensing data as slave data during a touch sensing interval;
a touch master controlling the touch slave and detect an existence or a non-existence of a touch or a touch coordinate based on the sensing data received from the touch slave;
a communication interface providing a communication path between the touch master and the touch slave; and
a filter unit filtering a noise component in the slave data output from the touch slave,
wherein the filter unit comprises:
a sampler sampling bits in the slave data according to predefined filter window information; and
a count comparator counting and comparing the number of first bit values of 0 and the number of second bit values of 1 in the sampled bits and determining the first bit value or the second bit value as a final value according to a result of the comparison,
wherein the predefined filter window information includes a number of bits for sampling range or window size to be sampled in the slave data or sampling locations at which the bits are sampled in the slave.

17. The touch display device of claim 16, wherein the sampled bits in the slave data are odd-numbered.

18. The touch display device of claim 16, wherein the filter unit is included in the touch master.

19. The touch display device of claim 16, wherein the filter unit is located between the touch slave and the touch master.

20. A touch master for a touch system, comprising:
a master interface unit comprising a clock signal port connected to a clock signal line for transmitting a clock signal to a touch slave, a master data port connected to a master data line for transmitting master data to the touch slave, and a slave data port connected to a slave data line for receiving slave data transmitted from the touch slave;
a master memory storing sensing data corresponding to the slave data received through the salve data port; and
a filter unit filtering a noise component in the salve data output from the touch slave,
wherein the filter unit comprises:

a sampler sampling bits in the slave data according to predefined filter window information; and
a count comparator counting and comparing the number of first bit values of 0 and the number of second bit values of 1 in the sampled bits and determining the first bit value or the second bit value as a final value according to a result of the comparison,
wherein the predefined filter window information includes a number of bits for sampling range or window size to be sampled in the slave data or sampling locations at which the bits are sampled in the slave.

* * * * *